(12) United States Patent
Nakade et al.

(10) Patent No.: US 7,194,747 B2
(45) Date of Patent: Mar. 20, 2007

(54) DISC APPARATUS

(75) Inventors: Isamu Nakade, Kanazawa (JP); Tsukasa Nakayama, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/544,283

(22) PCT Filed: Feb. 3, 2004

(86) PCT No.: PCT/JP2004/001086

§ 371 (c)(1),
(2), (4) Date: Aug. 3, 2005

(87) PCT Pub. No.: WO2004/070720

PCT Pub. Date: Aug. 19, 2004

(65) Prior Publication Data

US 2006/0053431 A1 Mar. 9, 2006

(30) Foreign Application Priority Data

Feb. 6, 2003 (JP) .............................. 2003-030078

(51) Int. Cl.
*G11B 17/22* (2006.01)
(52) U.S. Cl. ..................................... 720/662
(58) Field of Classification Search ............ None
See application file for complete search history.

(56) References Cited

U.S. PATENT DOCUMENTS 5,790,509 A * 8/1998 Noguchi ............... 720/662

2005/0114878 A1 * 5/2005 Nishida et al. ............ 720/676

FOREIGN PATENT DOCUMENTS

JP 2002-109810 A 4/2002

OTHER PUBLICATIONS

International Search Report corresponding to application No. PCT/JP2004/001086 dated May 18, 2004.

* cited by examiner

*Primary Examiner*—Hoa T. Nguyen
*Assistant Examiner*—Mark Blouin
(74) *Attorney, Agent, or Firm*—RatnerPrestia

(57) ABSTRACT

The disc apparatus according to the present invention comprises a base member (130), a chassis (140) pivotable with respect to the base member (130), a pickup unit (160) movably supported by the chassis (140) to be accessible to a disc, and a guide shaft (180) contactable with the pickup unit (160) to guide the pickup unit (160), and in which the guide unit (180) includes an end portion (180*a*) selectively assuming two operation positions including a contact position in which the end portion (180*a*) is brought into contact with the chassis (140) and a noncontact position in which the end portion (180*a*) is brought out of contact from the chassis (140), and the guide unit (180) is pivotable around an axis (181) extending in a direction (130*a*) substantially perpendicular to a moving direction (160*a*) in which the pickup unit (160) is movable with respect to the chassis (140).

5 Claims, 8 Drawing Sheets

DISC APPARATUS

This application is a U.S. national phase application of PCT international application PCT/JP2004/001086.

1. Technical Field of the Invention

The present invention relates to a disc apparatus having accommodated therein a plurality of disc shaped recording mediums and operative to carry out at least one of operations to record information on and reproduce information from the disc shaped recording mediums.

2. Description of the Related Art

As an example of a disc apparatus having accommodated therein a plurality of disc shaped recording mediums and operative to carry out at least one of operations to record information on and reproduce information from the disc shaped recording medium, there have been known a disc apparatus disclosed in the Japanese Patent Laid-Open publication No. 2002-109810.

The conventional disc apparatus 900 therein disclosed is shown in FIG. 8 as comprising a housing 910, a tray portion 920 accommodated in the housing 910 and having a plurality of trays 921 which are movably stacked with one another along a laying direction, a tray opening and closing means, not shown, for selectively opening and closing a slot between predetermined adjoining trays 921, a base member 930 accommodated in the housing 910, and a chassis 940 supported by the base member 930 to be pivotable around an axis 941 in a direction designated by an arrow 941a.

The conventional disc apparatus 900 further comprises a turntable 950 rotatably supported by the chassis 940 to retain a disc 990, a pickup unit 960 supported by the chassis 940 to be movable in a direction designated by an arrow 960a substantially perpendicular to a direction in which an axis 941 of the chassis 940 extends and to be accessible to the disc 990 retained by the turntable 950, a lead screw 970 supported by the chassis 940 to drive the pickup unit 960, and a guide shaft 980 supported by the chassis 940 to be contactable with the pickup unit 960 to guide the pickup unit 960. Here, the guide shaft 980 is supported by the chassis 940 to be pivotable around an axis 981 designated by an arrow 981a.

The following description will be directed to the operation of the conventional disc apparatus 900 thus constructed as previously mentioned.

Firstly, the tray opening and closing means is operated to open a slot between predetermined adjoining trays 921. The chassis 940 is then pivoted around the axis 941 in the direction designated by an arrow 941a from a position shown in FIG. 9 to a position shown in FIG. 8 and the guide shaft 980 is pivoted around the axis 981 in a direction designated by the arrow 981a from a position shown in FIG. 9 to a position shown in FIG. 8 to have the chassis 940 inserted into the slot between the predetermined adjoining trays 921 and the turntable 950 retain the disc 990 mounted on the trays 921. Under these conditions, the conventional disc apparatus 900 is operated to rotate the turntable 950 having the disc 990 mounted thereon while having the lead screw 970 and the guide shaft 980 move the pickup unit 960 with respect to the chassis 940 in the direction designated by the arrow 960a to carry out at least one of operations to record information on and reproduce information from the disc 990.

Further, the conventional disc apparatus 900 is operative to have the chassis 940, the turntable 950, the pickup unit 960, lead screw 970, and the guide shaft 980 moved to be stationary held in a position where the chassis 940, the turntable 950, the pickup unit 960, lead screw 970, and the guide shaft 980 are prevented from colliding with the disc 990 mounted on the trays 921 when the tray opening and closing means opens the slot between the predetermined adjoining trays 921 as clearly seen from FIG. 9.

The conventional disc apparatus 900, however, encounters such a drawback that a minimum distance 900b required to have the trays 921 and the chassis 940 accommodated in the housing 910 is predominantly determined by a distance 900a between the lead screw 970 and the guide shaft 980 thereby limiting the possibility of downsizing the conventional disc apparatus 900 as a whole, resulting from the fact that the guide shaft 980 is stationary held in a position between the disc 990 mounted on the trays 921 and the lead screw 970 as shown in FIG. 9.

It is, therefore, an object of the present invention to provide a disc apparatus which is small in size in comparison with the conventional disc apparatus.

DISCLOSURE OF THE INVENTION

In accordance wit a first aspect of the present invention, there is provided a disc apparatus comprising: a base member; a chassis movable with respect to the base member; a pickup unit movably supported by the chassis to be accessible to a disc; and a guide unit contactable with the pickup unit to guide the pickup unit, and in which the guide unit includes an end portion selectively assuming two operation positions including a contact position in which the end portion is brought into contact with the chassis and a noncontact position in which the end portion is brought out of contact from the chassis, the guide unit being pivotable around an axis extending in a direction substantially perpendicular to a moving direction in which the pickup unit is movable with respect to the chassis.

The disc apparatus according to the present invention thus constructed as previously mentioned can have trays and other constituent parts accommodated in a space defined between the chassis and the guide shaft while the chassis and the guide shaft are open, resulting from the fact that the chassis and the guide shaft are respectively pivotable to have the end portion forming part of the guide shaft selectively assume two operation positions including a contact position in which the end portion is brought into contact with the chassis and a noncontact position in which the end portion is brought out of contact from the chassis. This leads to the fact that a minimum distance required to have the trays and other constituent parts disposed between the chassis and the guide shaft can be reduced in comparison with the conventional disc apparatus, thereby making it possible for the disc apparatus to be small in size in comparison with the conventional disc apparatus.

In accordance with a second aspect of the present invention, there is provided a disc apparatus, in which the aforementioned guide unit is held in engagement with the chassis to be pivotable in combination with the chassis moving with respect to the base member.

The disc apparatus according to the present invention thus constructed as previously mentioned can have the chassis pivot with respect to the base member as well as have the guide unit pivot with respect to the chassis with a single motor unit. This leads to the fact that the disc apparatus can be small in size in comparison with the conventional disc apparatus, which comprises a first motor unit for having the chassis pivot with respect to the base member and a second motor unit for having the guide unit pivot with respect to the chassis.

In accordance with a third aspect of the present invention, there is provided a disc apparatus comprising: a base member; a chassis pivotably supported by the base member; a turntable rotatably supported by the chassis to rotate a disc; a pickup unit movably supported by the chassis to be accessible to the disc; a lead screw supported by the chassis to drive the pickup unit; and a guide unit contactable with the pickup unit to guide the pickup unit, and in which the guide unit includes an axis extending in a direction substantially perpendicular to a moving direction in which the pickup unit is movable with respect to the chassis, the guide unit being supported by the chassis to be pivotable around the axis and movable in combination with the chassis pivoting with respect to the base member to be held in engagement with the chassis.

The disc apparatus according to the present invention thus constructed as previously mentioned can have trays and other constituent parts accommodated in a space defined between the chassis and the guide shaft while the chassis and the guide shaft are open, resulting from the fact that the chassis and the guide shaft are respectively pivotable to have the end portion forming part of the guide shaft selectively assume two operation positions including a contact position in which the end portion is brought into contact with the chassis and a noncontact position in which the end portion is brought out of contact from the chassis. This leads to the fact that a minimum distance required to have the trays and other constituent parts disposed between the chassis and the guide shaft can be reduced in comparison with the conventional disc apparatus, thereby making it possible for the disc apparatus to be small in size in comparison with the conventional disc apparatus.

In accordance with a fourth aspect of the present invention, there is provided a disc apparatus, which further comprises: a motor unit for having the chassis pivot with respect to the base member, and in which the guide unit further includes a pin selectively assuming two operation positions including a contact position in which the pin is brought into contact with the chassis and a noncontact position in which the pin is brought out of contact from the chassis, the base member includes a cam groove portion engageable with the pin, the guide unit is pivotable with respect to the base member to have the end portion move toward the chassis under the condition that the chassis pivots with respect to the base member toward the end portion forming part of the guide unit, and the guide unit is pivotable with respect to the base member to have the end portion move away from the chassis under the condition that the chassis pivots with respect to the base member away from the end portion forming part of the guide unit.

The disc apparatus according to the present invention thus constructed as previously mentioned can have the chassis pivot with respect to the base member as well as have the guide unit pivot with respect to the chassis with a single motor unit. This leads to the fact that the disc apparatus can be small in size in comparison with the conventional disc apparatus, which comprises a first motor unit for having the chassis pivot with respect to the base member and a second motor unit for having the guide unit pivot with respect to the chassis.

In accordance with a fifth aspect of the present invention, there is provided a disc apparatus comprising: a base member; a chassis pivotably supported by the base member; a turntable rotatably supported by the chassis to rotate a disc; a pickup unit movably supported by the chassis to be accessible to the disc; a lead screw supported by the chassis to drive the pickup unit; and a guide unit contactable with the pickup unit to guide the pickup unit, and in which the guide unit includes an axis extending in a direction substantially perpendicular to a moving direction in which the pickup unit is movable with respect to the chassis, the guide unit being supported by the base member to be pivotable around the axis and pivotable independently from the chassis pivoting with respect to the base member to be held in engagement with the chassis.

The disc apparatus according to the present invention thus constructed as previously mentioned can have trays and other constituent parts accommodated in a space defined between the chassis and the guide shaft while the chassis and the guide shaft are open, resulting from the fact that the chassis and the guide shaft are respectively pivotable to have the end portion forming part of the guide shaft selectively assume two operation positions including a contact position in which the end portion is brought into contact with the chassis and a noncontact position in which the end portion is brought out of contact from the chassis. This leads to the fact that a minimum distance required to have the trays and other constituent parts disposed between the chassis and the guide shaft can be reduced in comparison with the conventional disc apparatus, thereby making it possible for the disc apparatus to be small in size in comparison with the conventional disc apparatus.

In accordance with a sixth aspect of the present invention, there is provided a disc apparatus, which further comprises: a motor unit for having the chassis pivot with respect to the base member; and a motor unit for having the guide unit pivot with respect to the chassis, and in which the guide unit further includes an end portion selectively assuming two operation positions including a contact position in which the end portion is brought into contact with the chassis and a noncontact position in which the end portion is brought out of contact from the chassis, the guide unit is pivotable with respect to the base member to have the end portion move toward the chassis under the condition that the chassis pivots with respect to the base member toward the end portion forming part of the guide unit, and the guide unit is pivotable with respect to the base member to have the end portion move away from the chassis under the condition that the chassis pivots with respect to the base member away from the end portion forming part of the guide unit.

In the disc apparatus according to the present invention thus constructed as previously mentioned, the chassis can be pivoted with respect to the base member independently from how the guide unit is pivoted with respect to the chassis.

In accordance with a seventh aspect of the present invention, there is provided a disc apparatus comprising: a base member; a chassis movably supported by the base member; a turntable rotatably supported by the chassis to rotate a disc; a pickup unit movably supported by the chassis to be accessible to the disc held by the turntable; a lead screw supported by the chassis to drive the pickup unit; and a guide unit contactable with the pickup unit to guide the pickup unit, and in which the guide unit includes an axis extending in a direction substantially perpendicular to a moving direction in which the pickup unit is movable with respect to the chassis, the guide unit being supported by the chassis to be pivotable around the axis and movable in combination with the chassis pivoting with respect to the base member to be held in engagement with the chassis.

The disc apparatus according to the present invention thus constructed as previously mentioned can have trays and other constituent parts accommodated in a space defined between the chassis and the guide shaft while the chassis and the guide shaft are open, resulting from the fact that the chassis and the guide shaft are respectively pivotable to have the end portion forming part of the guide shaft selectively assume two operation positions including a contact position in which the end portion is brought into contact with the chassis and a noncontact position in which the end portion is brought out of contact from the chassis. This leads to the fact that a minimum distance required to have the trays and other constituent parts disposed between the chassis and the guide shaft can be reduced in comparison with the conventional disc apparatus, thereby making it possible for the disc apparatus to be small in size in comparison with the conventional disc apparatus.

In accordance with an eighth aspect of the present invention, there is provided a disc apparatus, which further comprises: a motor unit for having the chassis move with respect to the base member; and a motor unit for having the guide unit pivot with respect to the chassis, and in which the guide unit further includes an end portion selectively assuming two operation positions including a contact position in which the end portion is brought into contact with the chassis and a noncontact position in which the end portion is brought out of contact from the chassis, the guide unit is pivotable with respect to the base member to have the end portion move toward the chassis under the condition that the chassis moves with respect to the base member toward the end portion forming part of the guide unit, and the guide unit is pivotable with respect to the base member to have the end portion move away from the chassis under the condition that the chassis moves with respect to the base member away from the end portion forming part of the guide unit.

In the disc apparatus according to the present invention thus constructed as previously mentioned, the chassis can be pivoted with respect to the base member independently from how the guide unit is pivoted with respect to the chassis.

BRIEF DESCRIPTION OF THE DRAWINGS

The features and advantages of a disc apparatus according to the present invention will be more clearly understood from the following description taken in conjunction with the accompanying drawings.

DESCRIPTION OF THE PREFERRED EMBODIMENTS

A preferred embodiment of the disc apparatus according to the present invention will be described hereinafter in accordance with the accompanying drawings, in particular FIGS. 1 to 7.

The following description will now be directed to the construction of the preferred embodiment of the disc apparatus according to the present invention.

Figure 1:
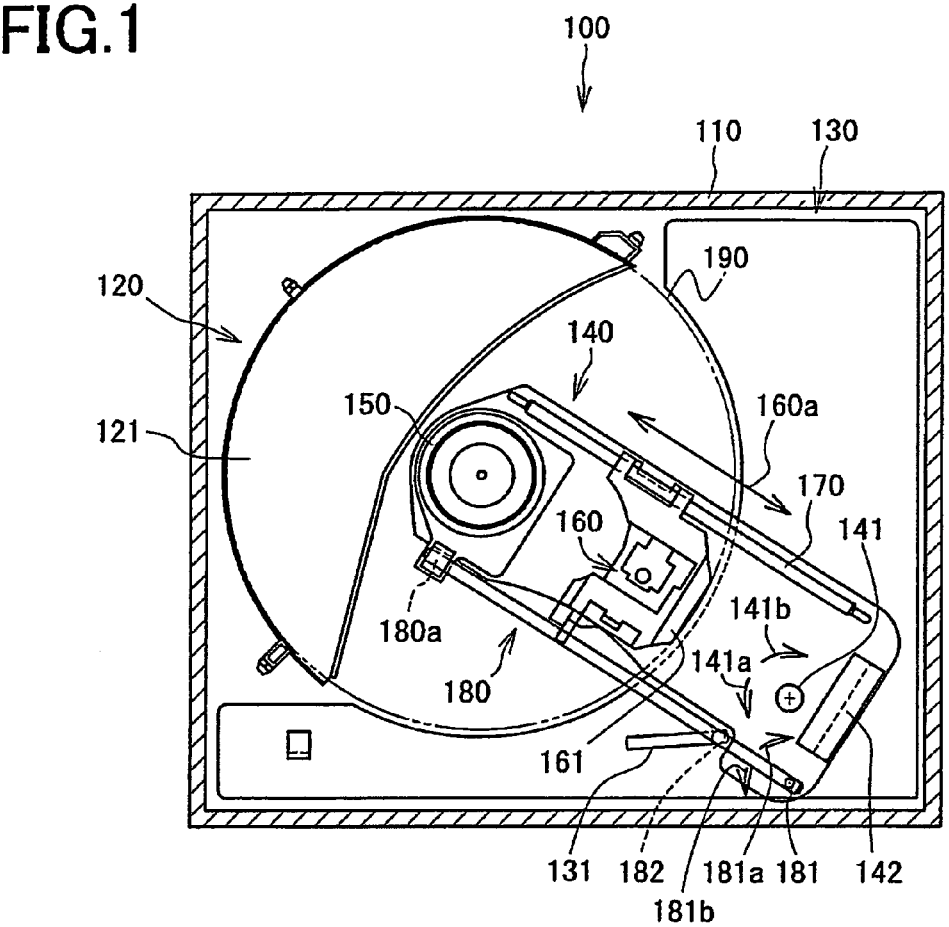
FIG. 1 is a cross sectional top view of a preferred embodiment of a disc apparatus according to the present invention.
Figure 2:
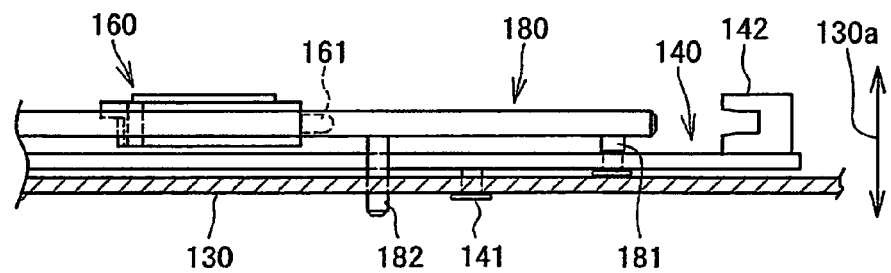
FIG. 2 is a cross sectional side view of the disc apparatus shown in FIG. 1.

As shown in FIGS. 1 and 2, the disc apparatus 100 comprises a housing 110, a tray portion 120 accommodated in the housing 110 and having a plurality of trays 121 which are movably stacked with one another along a laying direction, a tray opening and closing means, not shown, for selectively opening and closing a slot between predetermined adjoining trays 121, a base member 130 accommodated in the housing 110 and movable with respect to the housing 110 in a direction designated by an arrow 130a, and a chassis 140 supported by the base member 130 to be pivotable around an axis 141 in a direction designated by an arrow 141a or an arrow 141b.

The disc apparatus 100 further comprises a turntable 150 rotatably supported by the chassis 140 to retain a disc 190, and a pickup unit 160 supported by the chassis 140 to be movable in a direction designated by an arrow 160a substantially perpendicular to a direction in which the axis 141 of the chassis 140 extends and to be accessible to the disc 190 retained by the turntable 150.

Here, the chassis 140 includes a retaining portion 142 for retaining the pickup unit 160 and the pickup unit 160 includes an engaging portion 161 to be engageable with the retaining portion 142.

The disc apparatus 100 further comprises a lead screw 170 supported by the chassis 140 to drive the pickup unit 160, and a guide unit constituted by a guide shaft 180 contactable with the pickup unit 160 to guide the pickup unit 160.

Figure 3:
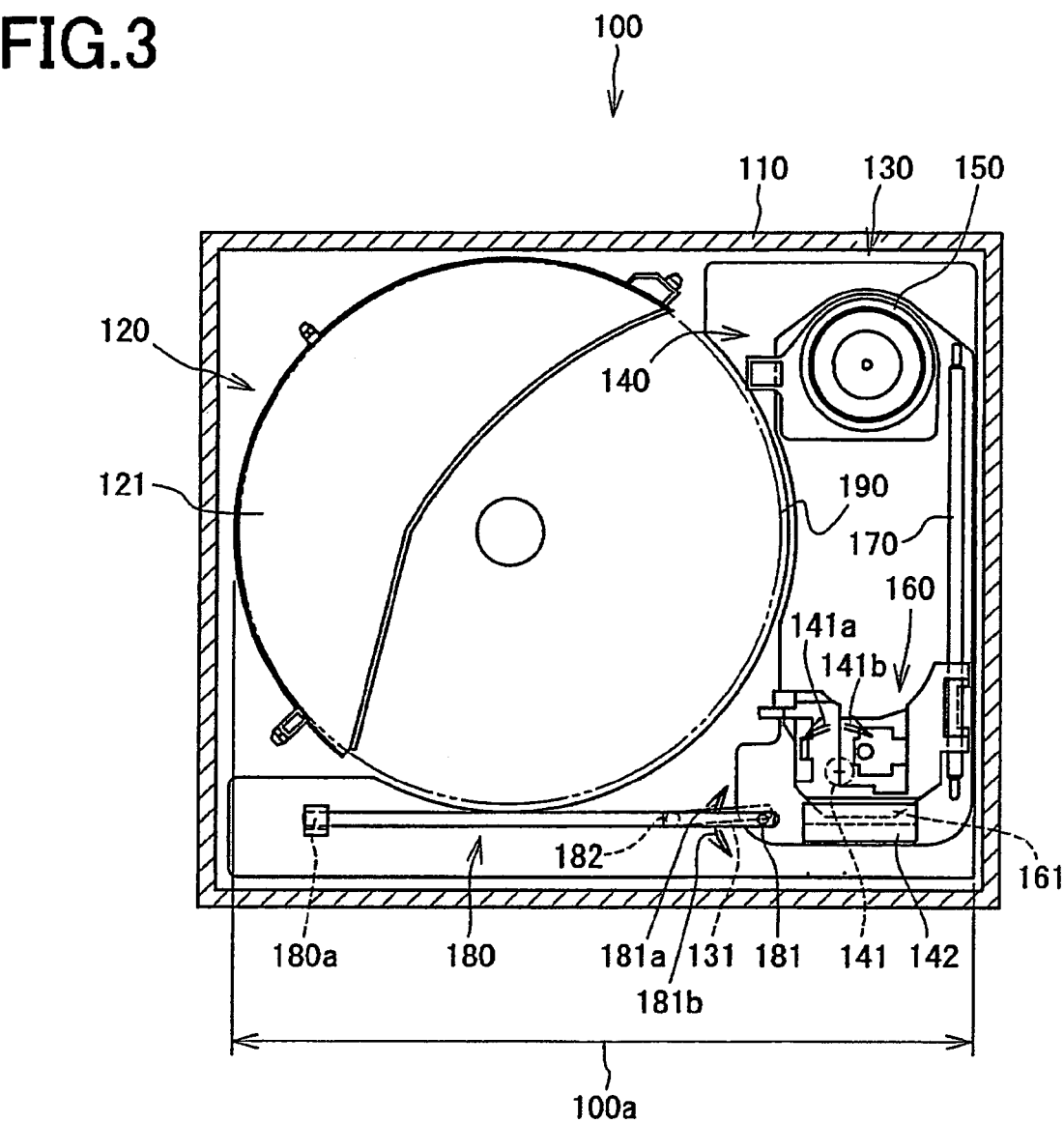
FIG. 3 is a cross sectional top view of the disc apparatus shown in FIG. 1, but in a state different from that shown in FIG. 1.
Figure 4:
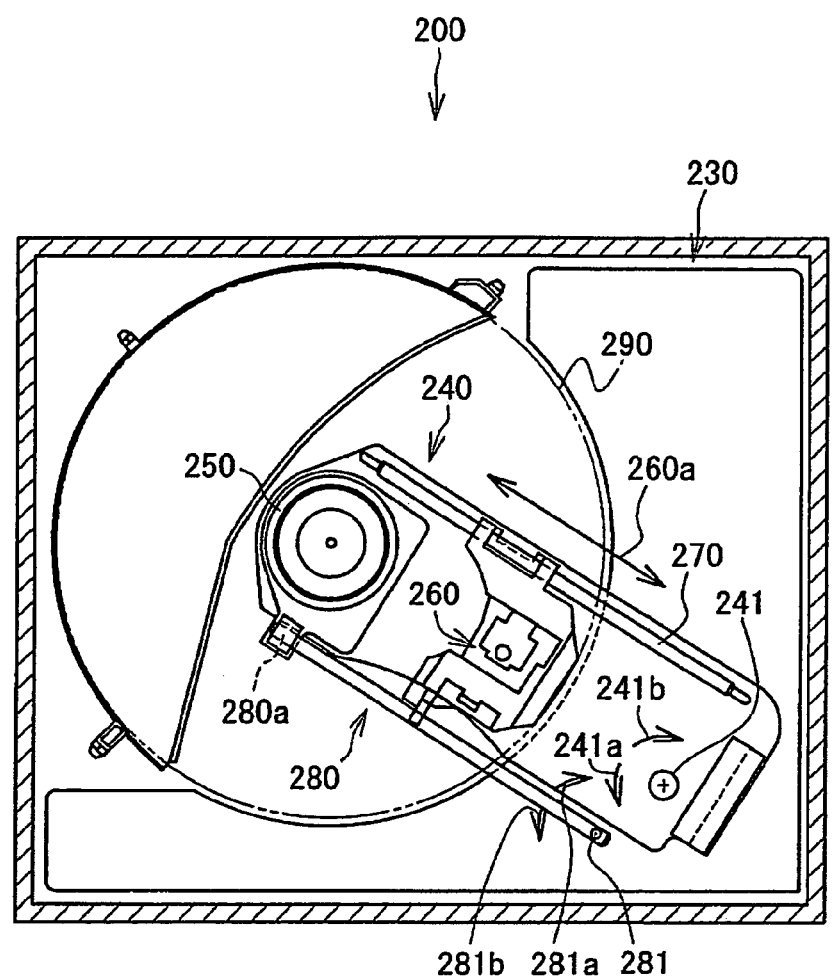
FIG. 4 is a cross sectional top view of another example of the disc apparatus different from the disc apparatus shown in FIG. 1.
Figure 5:
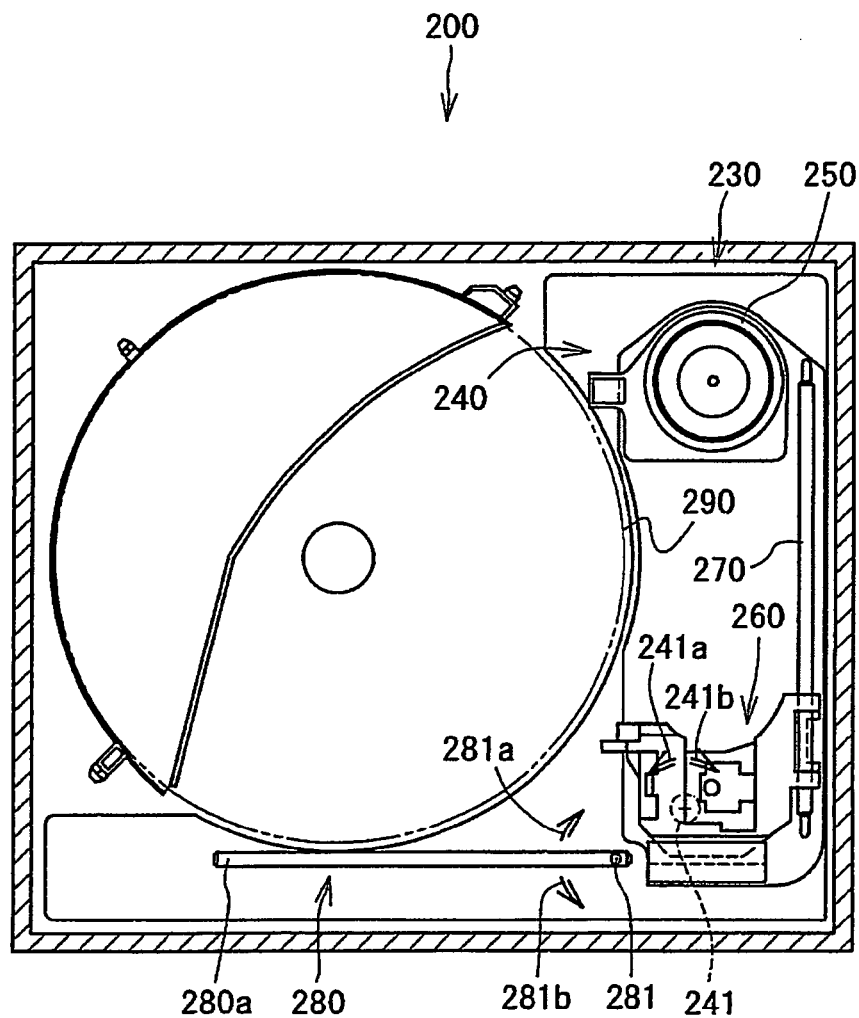
FIG. 5 is a cross sectional top view of the disc apparatus shown in FIG. 4, but in a state different from that shown in FIG. 4.
Figure 6:
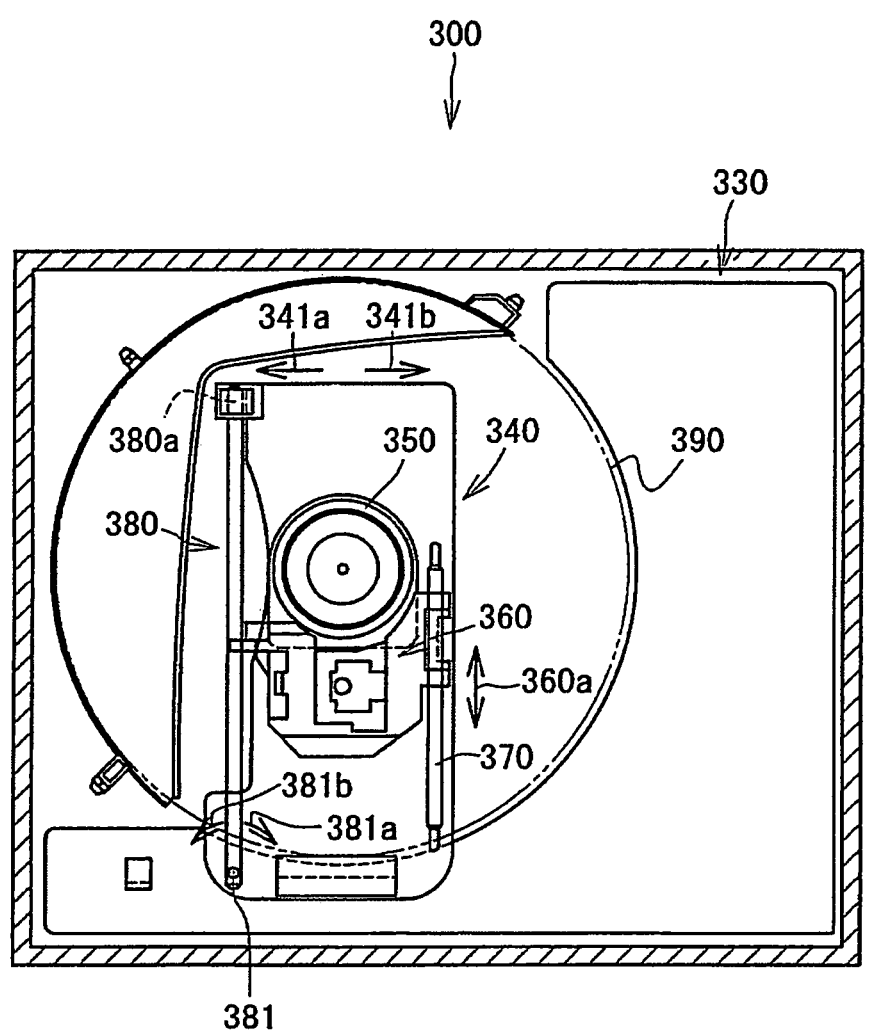
FIG. 6 is a cross sectional top view of another example of the disc apparatus different from the disc apparatuses shown in FIG. 1 and FIG. 4.
Figure 7:
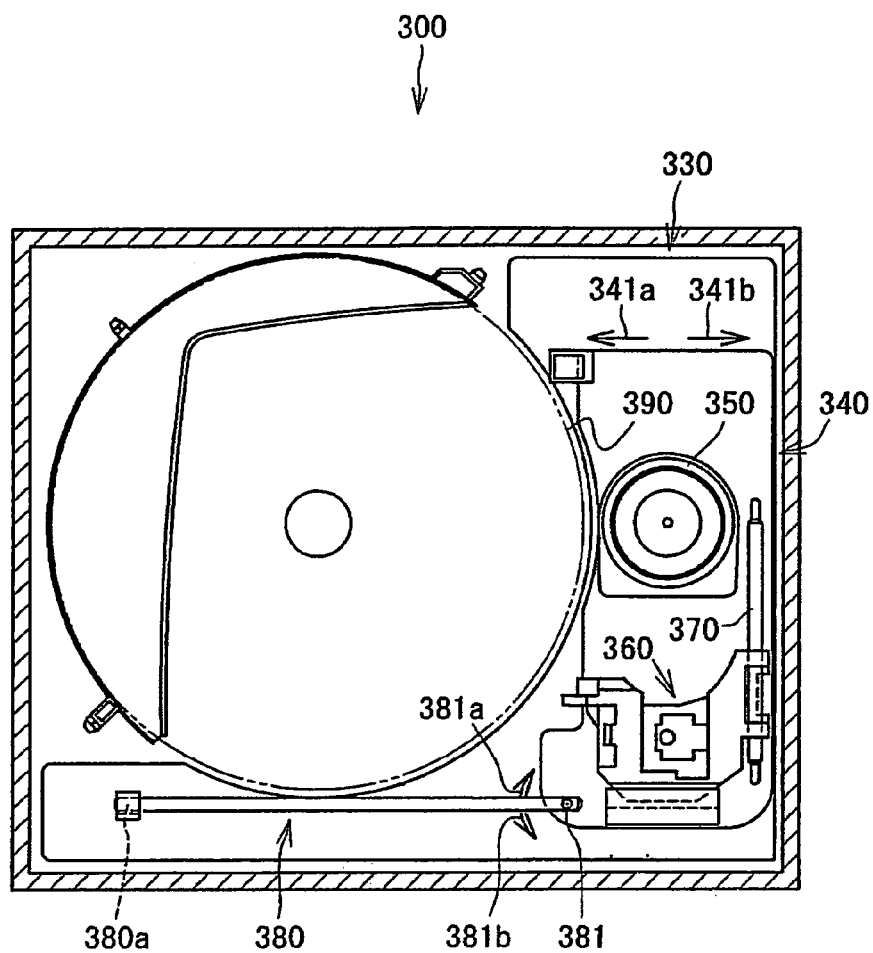
FIG. 7 is a cross sectional top view of the disc apparatus shown in FIG. 6, but in a state different from that shown in FIG. 6.
Figure 8:
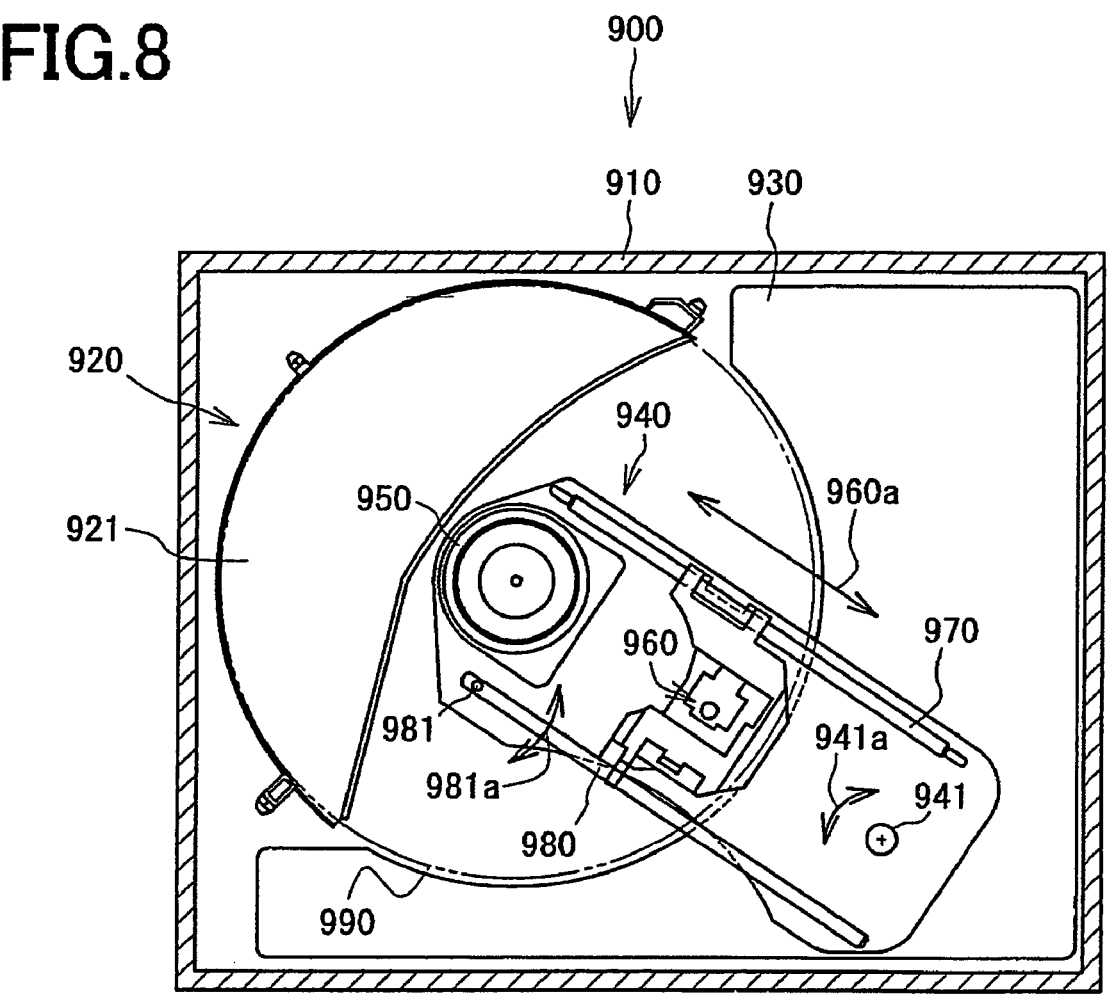
FIG. 8 is a cross sectional top view of the conventional disc apparatus.
Figure 9:
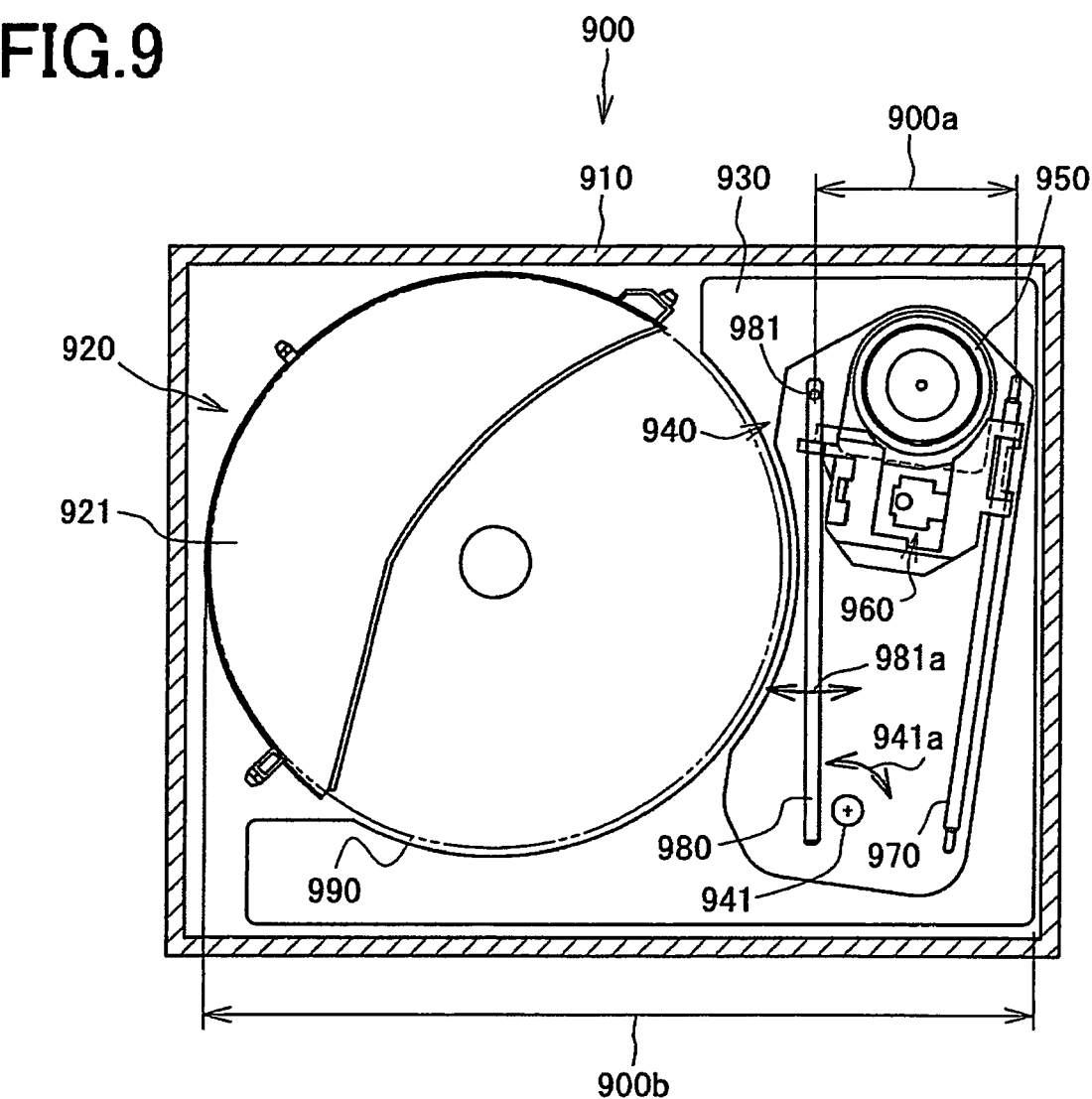
FIG. 9 is a cross sectional top view of the conventional disc apparatus shown in FIG. 8, but in a state different that shown in FIG. 8.

Here, the guide shaft 180 includes an end portion 180a selectively assuming two operation positions including a contact position in which the end portion 180a is brought into contact with the chassis 140 and a noncontact position in which the end portion 180a is brought out of contact from the chassis 140, and is supported by the chassis 140 to be pivotable with respect to the base member 130 around an axis 181 extending in the direction 130a substantially perpendicular to a moving direction designated by an arrow 160a, in which the pickup unit 160 is movable with respect to the chassis 140, in a direction shown by an arrow 181a or an arrow 181b. This means that the chassis 140 and the guide shaft 180 are respectively pivotable to selectively assume one of two states including an open state in which the chassis 140 and the guide shaft 180 are open as shown in FIG. 3 and a close state in which the chassis 140 and the guide shaft 180 are closed as shown in FIG. 1.

The guide shaft 180 further includes a pin 182 and the base member 130 includes a cam groove portion 131 engageable with the pin 182. The fact that the guide shaft 180 is supported by the chassis 140 to be pivotable around the axis 181 and the fact that the pin 182 forming part of the guide shaft 180 is held in engagement with the cam groove portion 131 formed in the base member 130 lead to the fact that the guide shaft 180 is pivotable with respect to the base member 130 in a direction designated by an arrow 181a to have the end portion 180a move toward the chassis 140 under the condition that the chassis 140 pivots with respect to the base member 130 in a direction designated by an arrow 141a toward the end portion 180a forming part of the guide shaft 180 and the guide shaft 180 is pivotable with respect to the base member 130 in a direction designated by an arrow 181b to have the end portion 180a move away from the chassis 140 under the condition that the chassis 140 pivots with respect to the base member 130 in a direction designated by an arrow 141b away from the end portion 180a forming part of the guide shaft 180. This means that the guide shaft 180 is held in engagement with the base member 130 and the chassis 140 in such a manner that the guide shaft 180 is pivotable in combination with the chassis 140 moving with respect to the base member 130.

The following description will then be directed to the operation of the present embodiment of the disc apparatus according to the present invention.

Firstly, in the disc apparatus 100, the base member 130 is moved with respect to the housing 110 in the direction designated by the arrow 130a up to a predetermined position and the tray opening and closing means is operated to open a slot between predetermined adjoining trays 121. The chassis 140 is then pivoted around the axis 141 with respect to the base member 130 in the direction designated by the arrow 141a from a position shown in FIG. 3 to a position shown in FIG. 1 to have the chassis 140 inserted into the slot between the predetermined adjoining trays 121.

While the chassis 140 is pivoted with respect to the base member 130 from the position shown in FIG. 3 to the position shown in FIG. 1, the pin 182 forming part of the guide shaft 180 is moved along the cam groove portion 131 from a position shown in FIG. 1 to a position shown in FIG. 3. This results in the fact that the guide shaft 180 is pivoted around the axis 181 with respect to the chassis 140 in the direction designated by the arrow 181a from a position shown in FIG. 3 to a position shown in FIG. 1 to be engaged with the chassis 140 at the end portion 180a and held in parallel relationship with the lead screw 170.

Then, the turntable 150 is operated to hold the disc 190 mounted on the tray 121. Under these conditions, the disc apparatus 100 is operated to rotate the turntable 150 having the disc 190 mounted thereon while having the lead screw 170 and the guide shaft 180 move the pickup unit 160 with respect to the chassis 140 in the direction shown by the arrow 160a to carry out at least one of operations to record information on and reproduce information from the disc 190.

Further, in order to exchange or eject the disc 190 retained by the turntable 160, the disc apparatus 100 is operated to move the pickup unit 160 with respect to the chassis 140 in the direction designated by the arrow 160a until the engaging portion 161 forming part of the pickup unit 160 is held in engagement with the retaining portion 142 forming part of the chassis 140 when, at least either one of the tray 121 and the base member 130 is moved in the direction designated by the arrow 130a with respect to the housing 110.

The disc apparatus 100 is then operated to have the chassis 140 pivoted with respect to the base member 130 around the axis 141 in the direction designated by the arrow 141b from a position shown in FIG. 1 to a position shown in FIG. 3 to eject the chassis 140 from the slot between the predetermined trays 121.

While the chassis 140 is pivoted with respect to the base member 130 from the position shown in FIG. 1 to the position show in FIG. 3, the pin 182 forming part of the guide shaft 180 is moved along the cam groove portion 131 formed in the base member 130 from a position shown in FIG. 1 to a position shown in FIG. 3. This results in the fact that the guide shaft 180 is pivoted with respect to the chassis 140 around the axis 181 in the direction shown by the arrow 181b from a position shown in FIG. 1 to a position shown in FIG. 3 to be held in engagement with the base member 130 at the end portion 180a.

When the disc apparatus 100 is in a state as shown in FIG. 3, the chassis 140, the turntable 150, the pickup unit 160, lead screw 170, and the guide shaft 180 can be prevented from colliding with the disc 190 mounted on the trays 121 even through at least either one of the tray 121 and the base member 130 is moved with respect to the housing 110 in the direction designated by the arrow 130a shown in FIG. 2.

As will be seen from the foregoing description, it will be understood that the trays 121 and other constituent parts can be accommodated in a space defined between the chassis 140 and the guide shaft 180 while the chassis 140 and the guide shaft 180 are open, viz., the end portion 180a forming part of the guide shaft 180 assumes the noncontact position as shown in FIG. 3, resulting from the fact that the chassis 140 and the guide shaft 180 are respectively pivotable to have the end portion 180a forming part of the guide shaft 180 selectively assume two operation positions including a contact position in which the end portion 180a is brought into contact with the chassis 140 and a noncontact position in which the end portion 180a is brought out of contact from the chassis 140. This leads to the fact that a minimum distance 100a required to have the trays 121 and other constituent parts disposed between the chassis 140 and the guide shaft 180 can be reduced in comparison with the conventional disc apparatus, thereby making it possible for the disc apparatus 100 to be small in size in comparison with the conventional disc apparatus.

Further, the disc apparatus 100 according to the present invention can have the chassis 140 pivot with respect to the base member 130 as well as have the guide shaft 180 pivot with respect to the chassis 140 with a single motor unit. This leads to the fact that the disc apparatus 100 can be small in size in comparison with the conventional disc apparatus, which comprises a first motor unit for having the chassis 140 pivot with respect to the base member 130 and a second motor unit for having the guide shaft 180 pivot with respect to the chassis 140, resulting from the fact that the guide shaft 180 is held in engagement with the base member 130 and the chassis 140 to be pivotable in combination with the chassis 140 pivoting with respect to the base member 130.

The disc 190 mounted on the trays 121 can be in part accommodated in a space between the turntable 150 and the pickup unit 160 resulting from the fact that the pickup unit 160 is disposed in the vicinity of the axis 141 and spaced apart from the turntable 150 while the disc apparatus 100 is in a state as shown in FIG. 3, as described in the present embodiment. This leads to the fact that the disc apparatus 100 can be small in size in comparison with the conventional disc apparatus, in which the pickup unit 160 is disposed in the vicinity of the turntable 150 and spaced apart from the axis 141. It is, however, needless to mention that in the disc apparatus according to the present invention the pickup unit 160 may be disposed in the vicinity of the turntable 150 and spaced apart from the axis 141 while the disc apparatus 100 is in a state as shown in FIG. 3, Though it has been described in the present embodiment that the pickup unit 160 is disposed in the vicinity of the axis 141 and spaced apart from the turntable 150 while the disc apparatus 100 is in a state as shown in FIG. 3.

Further, the disc apparatus according to the present invention may further comprise a first motor unit for having the chassis 140 pivot with respect to the base member 130 and a second motor unit for having the guide shaft 180 pivot with respect to the chassis 140 wherein the first motor unit is independent from the second motor unit. This means that the disc apparatus 100 may be replaced with, for example, a disc apparatus 200, which will be described hereinlater with reference to FIGS. 4 and 5.

The disc apparatus 200 comprises a base member 230, a chassis 240 supported by the base member 230 to be pivotable around an axis 241 in a direction designated by an arrow 241a or an arrow 241b, a turntable 250 rotatably supported by the chassis 240 to retain a disc 290, a pickup unit 260 movably supported by the chassis 240 to be accessible to the disc 290, a lead screw 270 supported by the chassis 240 to drive the pickup unit 260, and a guide unit constituted by a guide shaft 280 contactable with the pickup unit 260 to guide the pickup unit 260.

The guide shaft 280 further includes an end portion 280a selectively assuming two operation positions including a contact position in which the end portion 280a is brought into contact with the chassis 240 and a noncontact position in which the end portion 280a is brought out of contact from the chassis 240, and is supported by the base member 230 to be pivotable around an axis 281 extending in a direction substantially perpendicular to a moving direction designated by an arrow 260a, in which the pickup unit 260 is movable with respect to the chassis 240, in a direction shown by an arrow 281a or an arrow 281b.

Further, the guide shaft 280 is pivotable with respect to the base member 230 in a direction designated by an arrow 281a to have the end portion 280a move toward the chassis 240 under the condition that the chassis 240 pivots with respect to the base member 230 in a direction designated by an arrow 241a toward the end portion 280a forming part of the guide shaft 280 and the guide shaft 280 is pivotable with respect to the base member 230 in a direction designated by an arrow 281b to have the end portion 280a move away from the chassis 240 under the condition that the chassis 240 pivots with respect to the base member 230 in a direction designated by an arrow 241b away from the end portion 280a forming part of the guide shaft 280.

The disc apparatus 200 further comprises a first motor unit for having the chassis 240 pivot with respect to the base member 230 and a second motor unit for having the guide shaft 280 pivot with respect to the chassis 240. Here, the first motor unit is independent from the second motor unit so that the chassis 240 pivots with respect to the base member 230 independently of how the guide shaft 280 pivots with respect to the chassis 240.

Though it has been described in the present embodiment that the chassis 140 is pivotable with respect to the base member 130, in the disc apparatus according to the present invention, the operation of the chassis 140 is not limited to the pivotal movement but may be carried out by any other operation as long as the chassis 140 is movable with respect to the base member 130. This means that the disc apparatus 100 may be replaced with, for example, a disc apparatus 300, which will be described hereinlater with reference to FIGS. 6 and 7.

The disc apparatus 300 comprises a base member 330, a chassis 340 supported by the base member 330 to be movable in a direction designated by an arrow 341a or an arrow 341b, a turntable 350 rotatably supported by the chassis 340 to retain a disc 390, a pickup unit 360 movably supported by the chassis 340 to be accessible to the disc 390, a lead screw 370 supported by the chassis 340 to drive the pickup unit 360, and a guide unit constituted by a guide shaft 380 contactable with the pickup unit 360 to guide the pickup unit 360.

The guide shaft 380 further includes an end portion 380a selectively assuming two operation positions including a contact position in which the end portion 380a is brought into contact with the chassis 340 and a noncontact position in which the end portion 380a is brought out of contact from the chassis 340, and is supported by the chassis 340 to be pivotable around an axis 381 extending in a direction substantially perpendicular to a moving direction designated by an arrow 360a, in which the pickup unit 360 is movable with respect to the chassis 340, in a direction shown by an arrow 381a or an arrow 381b.

Further, the guide shaft 380 is pivotable with respect to the base member 330 in a direction designated by an arrow 381a to have the end portion 380a move toward the chassis 340 under the condition that the chassis 340 moves with respect to the base member 330 in a direction designated by an arrow 341a toward the end portion 380a forming part of the guide shaft 380 and the guide shaft 380 is pivotable with respect to the base member 330 in a direction designated by an arrow 381b to have the end portion 380a move away from the chassis 340 under the condition that the chassis 340 moves with respect to the base member 330 in a direction designated by an arrow 341b away from the end portion 380a forming part of the guide shaft 380.

INDUSTRIAL APPLICABILITY OF THE PRESENT INVENTION

From the foregoing description, it will be understood that the disc apparatus according to the prevent invention is useful as a disc apparatus having accommodated therein a plurality of disc shaped recording mediums and operative to carry out at least one of operations to record information on and reproduce information from the disc shaped recording medium and especially appropriate for a disc changer apparatus required to be small in size.

What is claimed is:

1. A disc apparatus comprising:
   a base member;
   a chassis movable with respect to said base member;
   a pickup unit movably supported by said chassis to be accessible to a disc; and
   a guide unit contactable with said pickup unit to guide said pickup unit, and in which
   said guide unit includes an end portion selectively assuming two operation positions including a contact position in which said end portion is brought into contact with said chassis and a noncontact position in which said end portion is brought out of contact from said chassis, said guide unit being pivotable around an axis extending in a direction substantially perpendicular to a moving direction in which said pickup unit is movable with respect to said chassis.

2. A disc apparatus as set forth in claim 1, in which said guide unit is held in engagement with said chassis to be pivotable in combination with said chassis moving with respect to said base member.

3. A disc apparatus comprising:
   a base member;
   a chassis pivotably supported by said base member
   a turntable rotatably supported by said chassis to rotate a disc;
   a pickup unit movably supported by said chassis to be accessible to said disc;
   a lead screw supported by said chassis to drive said pickup unit; and a guide unit contactable with said pickup unit to guide said pickup unit, and in which said guide unit includes an axis extending in a direction substantially perpendicular to a moving direction in which said pickup unit is movable with respect to said chassis, said guide unit being supported by said chassis to be pivotable around said axis and movable in combination with said chassis pivoting with respect to said base member to be held in engagement with said chassis;

a motor unit for having said chassis pivot with respect to said base member, and in which said guide unit further includes a pin selectively assuming two operation positions including a contact position in which said pin is brought into contact with said chassis and a noncontact position in which said pin is brought out of contact from said chassis, said base member includes a cam groove portion engageable with said pin, said guide unit is pivotable with respect to said base member to have said end portion move toward said chassis under the condition that said chassis pivots with respect to said base member toward said end portion forming part of said guide unit, and said guide unit is pivotable with respect to said base member to have said end portion move away from said chassis under the condition that said chassis pivots with respect to said base member away from said end portion forming part of said guide unit.

4. A disc apparatus comprising:

a base member;

a chassis pivotably supported by said base member;

a turntable rotatably supported by said chassis to rotate a disc;

a pickup unit movably supported by said chassis to be accessible to said disc;

lead screw supported by said chassis to drive said pickup unit; and a guide unit contactable with said pickup unit to guide said pickup unit, and in which said guide unit includes an axis extending in a direction substantially perpendicular to a moving direction in which said pickup unit is movable with respect to said chassis, said guide unit being supported by said base member to be pivotable around said axis and pivotable independently from said chassis pivoting with respect to said base member to be held in engagement with said chassis;

a motor unit for having said chassis pivot with respect to said base member; and a motor unit for having said guide unit pivot with respect to said chassis, and in which said guide unit further includes an end portion selectively assuming two operation positions including a contact position in which said end portion is brought into contact with said chassis and a noncontact position in which said end portion is brought out of contact from said chassis, said guide unit is pivotable with respect to said base member to have said end portion move toward said chassis under the condition that said chassis pivots with respect to said base member toward said end portion forming part of said guide unit, and said guide unit is pivotable with respect to said base member to have said end portion move away from said chassis under the condition that said chassis pivots with respect to said base member away from said end portion forming part of said guide unit.

5. A disc apparatus comprising:

a base member;

a chassis movably supported by said base member;

a turntable rotatably supported by said chassis to rotate a disc;

a pickup unit movably supported by said chassis to be accessible to said disc held by said turntable;

a lead screw supported by said chassis to drive said pickup unit; and a guide unit contactable with said pickup unit to guide said pickup unit, and in which said guide unit includes an axis extending in a direction substantially perpendicular to a moving direction in which said pickup unit is movable with respect to said chassis, said guide unit being supported by said chassis to be pivotable around said axis and movable in combination with said chassis pivoting with respect to said base member to be held in engagement with said chassis;

a motor unit for having said chassis move with respect to said base member; and a motor unit for having said guide unit pivot with respect to said chassis, and in which said guide unit further includes an end portion selectively assuming two operation positions including a contact position in which said end portion is brought into contact with said chassis and a noncontact position in which said end portion is brought out of contact from said chassis, said guide unit is pivotable with respect to said base member to have said end portion move toward said chassis under the condition that said chassis moves with respect to said base member toward said end portion forming part of said guide unit, and said guide unit is pivotable with respect to said base member to have said end portion move away from said chassis under the condition that said chassis moves with respect to said base member away from said end portion forming part of said guide unit.

* * * * *